(12) United States Patent
Nishioka

(10) Patent No.: US 6,488,528 B2
(45) Date of Patent: Dec. 3, 2002

(54) CONNECTOR DEVICE FOR CARD WITH DETECTION SWITCH FOR DETECTING FITTING OF CARD

(75) Inventor: Toru Nishioka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/885,988

(22) Filed: Jun. 18, 2001

(65) Prior Publication Data

US 2002/0004327 A1 Jan. 10, 2002

(30) Foreign Application Priority Data

Jul. 10, 2000 (JP) ...................................... 2000-213388

(51) Int. Cl.$^7$ ................................................ H01R 3/00
(52) U.S. Cl. ...................................... 439/489; 439/188
(58) Field of Search ................................ 439/489, 159, 439/160, 152–155, 398, 157, 188

(56) References Cited

U.S. PATENT DOCUMENTS

| | | |
|---|---|---|
| 5,370,544 A | 12/1994 | Reichardt et al. |
| 5,395,259 A | 3/1995 | Casses ........................ 439/188 |
| 6,017,231 A | 1/2000 | Yoshitsugu et al. ......... 439/159 |
| 6,296,500 B1 * | 10/2001 | Liao ........................... 439/188 |
| 6,319,029 B2 * | 11/2001 | Nishioka .................... 439/159 |

FOREIGN PATENT DOCUMENTS

EP 0908981 4/1999 ........... H01R/23/72

OTHER PUBLICATIONS

European Search Report, Oct. 22, 2001.

* cited by examiner

Primary Examiner—Renee Luebke
Assistant Examiner—Phuongchi T Nguyen
(74) Attorney, Agent, or Firm—Beyer Weaver & Thomas, LLP

(57) ABSTRACT

According to the present invention, a card connector device includes: a slide member for engaging with a card attached to and detached from a housing slidable in a direction of inserting and discharging the card; a return spring for biasing the slide member in the direction of discharging the card; a lock for holding the slide member against the biasing force of the return spring at a position where the card is fitted; and a push rod arranged to be able to shift between a standby position and a pushed position for unlocking the lock by pressing manipulation to shift the slide member to a discharge position of the card, wherein a switch is provided in the housing, the switch operating in accordance with engagement/disengagement of the slide member and the lock and detecting that the card is held at the fit position by engaging with the lock.

2 Claims, 15 Drawing Sheets

CONNECTOR DEVICE FOR CARD WITH DETECTION SWITCH FOR DETECTING FITTING OF CARD

BACKGROUND OF THE INVENTION

1. Field of the Invention

The present invention relates to the structure of a card connector device utilized with an Integrated Circuit (IC) card used, for example, as a memory medium in a personal computer, or utilized with a Compact Flash (CF) card used in electronic equipment such as a digital camera.

2. Description of the Related Art

IC card connector devices are generally used as a recording device additionally installed in personal computers and the like. The IC card has been widely used as the memory medium of an IC card connector device.

The IC card is fitted into the IC card connector device to carry out writing and reading of necessary information. In order to properly and accurately write to and read from the IC card, there is currently available an IC card connector device in which, when an IC card is inserted, it is detected that the IC card is locked at the fit position before the writing and the reading of data is carried out.

There is known in the prior art a conventional IC card lock-detecting mechanism, in which a detection switch is provided in a housing comprising: a slide member for carrying the IC card, a lock for holding the slide member at the fitted position of the IC card, a push rod for unlocking the lock, and a spring member for biasing the slide member in the discharge direction when the lock is unlocked. When the IC card is inserted into the housing and is locked at the fit position, the detection switch is pushed by the fitted IC card thus verifying that the IC card is locked at the fitted position.

However, in the structure of the conventional IC card connector device described above, the IC card lock detection is carried out by pressing the detection switch with the IC card. It is difficult by this means to adjust the position where the detection switch is ON when the IC card is fitted and locked. Situations occur where in spite of an ON state of the detection switch, the IC card is not yet locked or in spite of a fitted and locked state of the IC card, the detection switch is OFF. In these situations, writing or reading of data to or from the IC card cannot be carried out properly and accurately.

Therefore, the present invention is made in order to solve the above problems and an object of the present invention is to provide a simple card connector device structure having a card lock-detecting mechanism that, without increasing the number of parts in the structure, reliably detects that the card is fitted and locked.

SUMMARY OF THE INVENTION

As a first means for solving the above problems according to the present invention, a card connector device comprises: a slide member for engaging a card attached to and detached from a housing, slidable in the card inserting and discharging direction; a return spring for biasing the slide member in the direction of discharging the card; a lock for holding the slide member against the biasing force of the return spring at a position where the card is fitted; and a push rod arranged to be able to shift between a standby position and a pushed position for unlocking the lock by pressing manipulation to shift the slide member to a discharge position of the card, wherein a switch is provided in the housing, the switch operating in accordance with engagement/disengagement of the slide member and the lock and detecting that the card is held at the fit position by engaging with the lock.

Also, as a second means according to the present invention, the lock comprises a biasing member supported in the housing capable of biasing the lock to turn in a direction that engages the lock with the slide member, wherein the push rod is provided with a holding projection for holding the lock against the biasing force of the biasing member at a position where the lock disengages from the slide member when the slide member is shifted to the fit position of the card, and a recess for shifting the lock to a position where the lock engages with the slide member when the slide member is shifted to the fit position of the card.

Also, as a third means according to the present invention, the push rod is provided with an engagement piece abutting against the slide member, so that when the slide member is shifted to the fit position of the card, the holding projection disengages from the lock by pressing the engagement piece.

Also, as a fourth means according to the present invention, a lock piece for engaging with and disengaging from the slide member by turning and a switch-manipulation piece for operating the switch are integrally formed in the lock.

BRIEF DESCRIPTION OF THE DRAWINGS

The above objects, other objects, features and advantages of the present invention will be better understood from the following description taken in conjunction with the accompanying drawings, in which.

DETAILED DESCRIPTION OF THE PREFERRED EMBODIMENT

Figure 1:
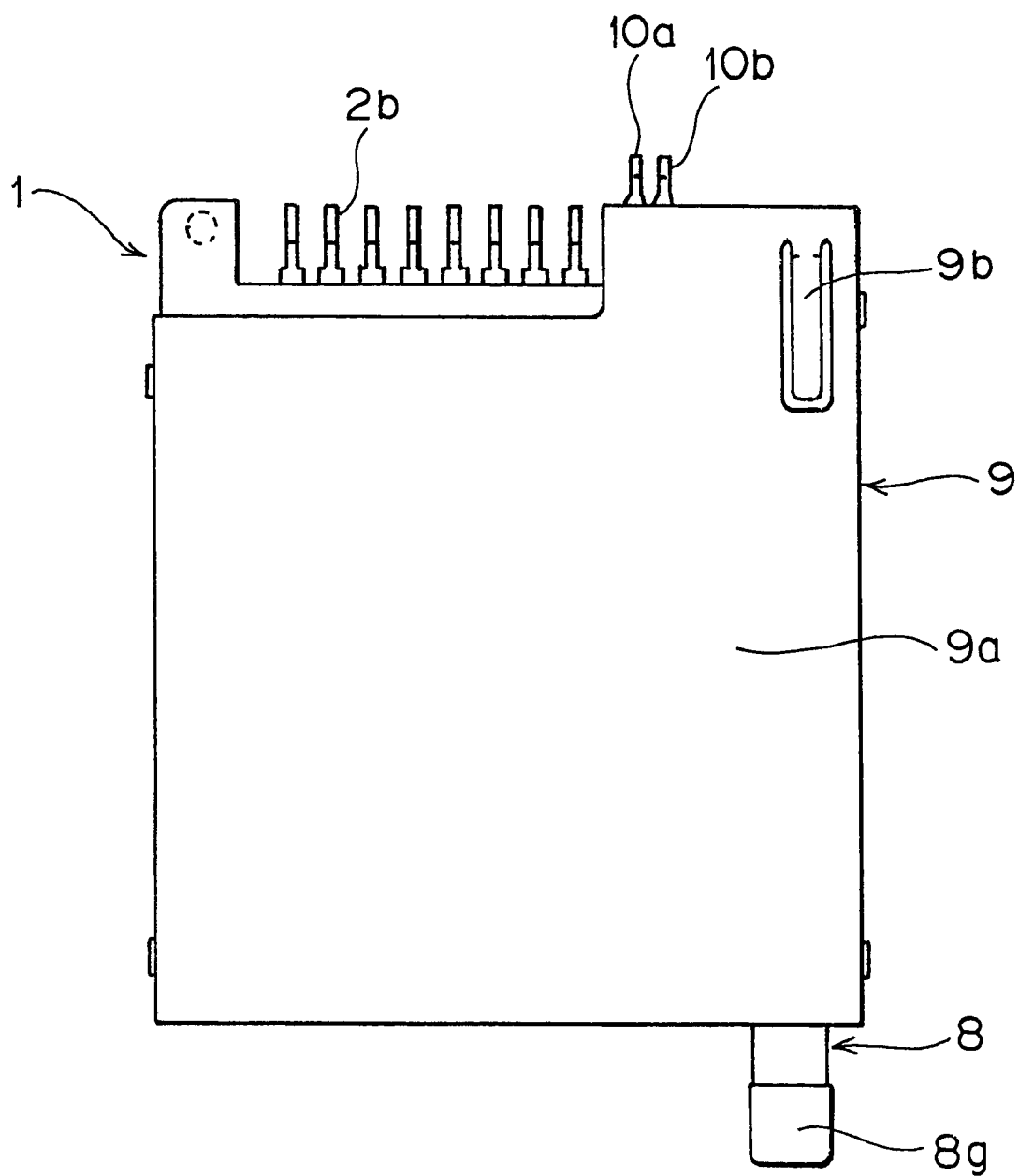
FIG. 1 is a plan view showing a card connector device according to an embodiment of the present invention.
Figure 2:
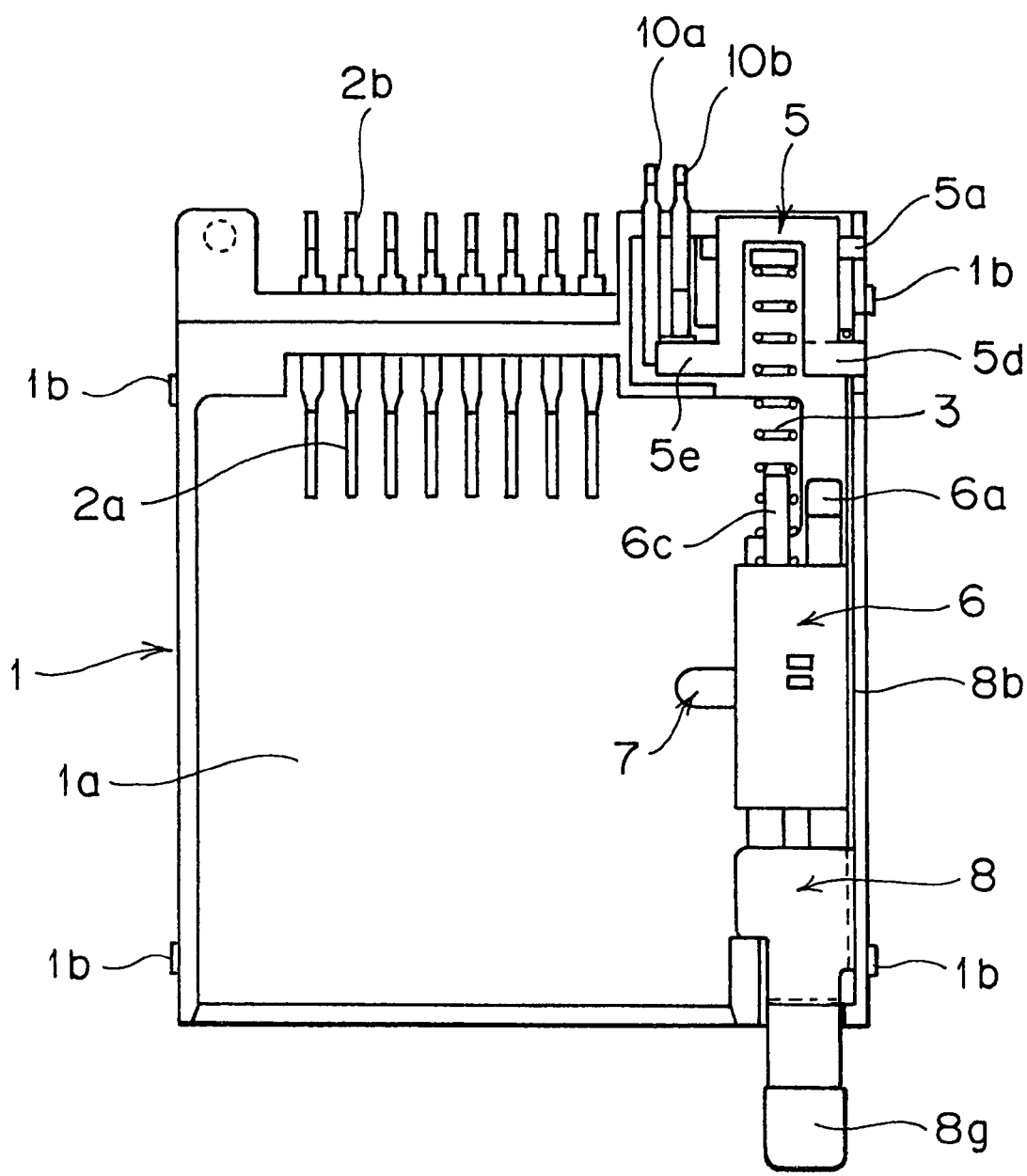
FIG. 2 is a plan view showing the card connector device according to an embodiment of the present invention in a state that a cover is removed.
Figure 3:
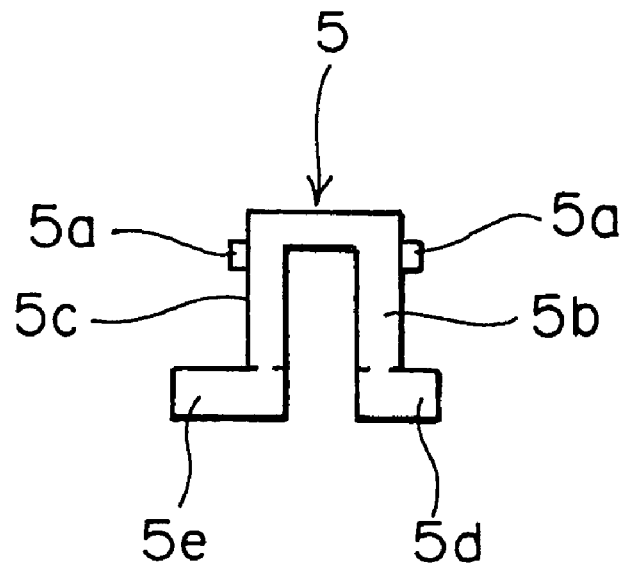
FIG. 3 is a plan view showing a lock according to an embodiment of present invention.
Figure 4:
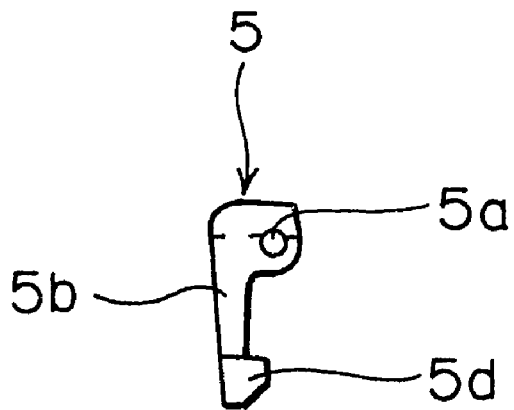
FIG. 4 is a side view showing the lock according an embodiment of the present invention.
Figure 5:
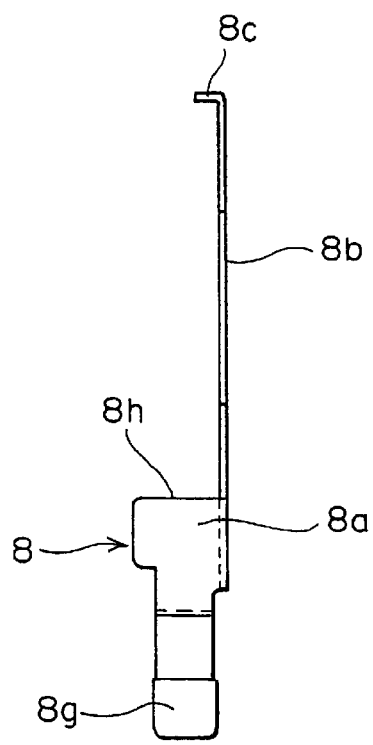
FIG. 5 is a plan view showing a push rod according to an embodiment of the present invention.
Figure 6:
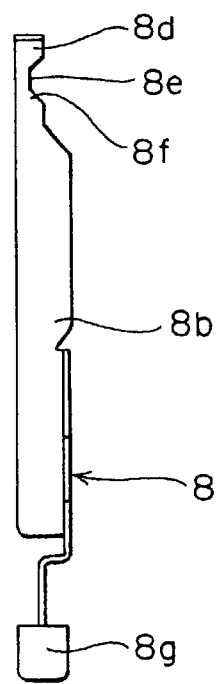
FIG. 6 is a side view showing the push rod according to an embodiment of the present invention.
Figure 7:
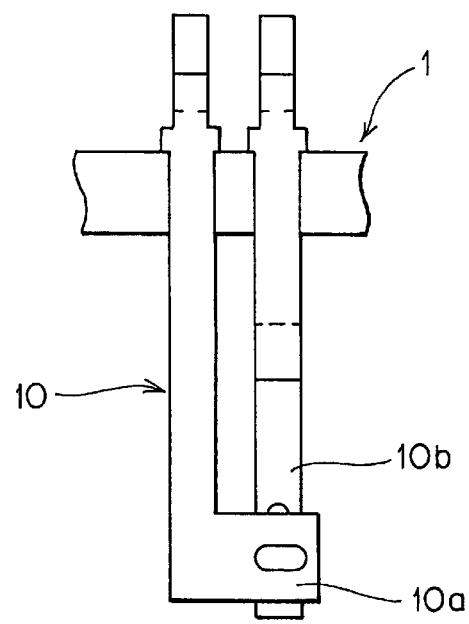
FIG. 7 is a plan view showing a switch according to an embodiment of the present invention.
Figure 8:
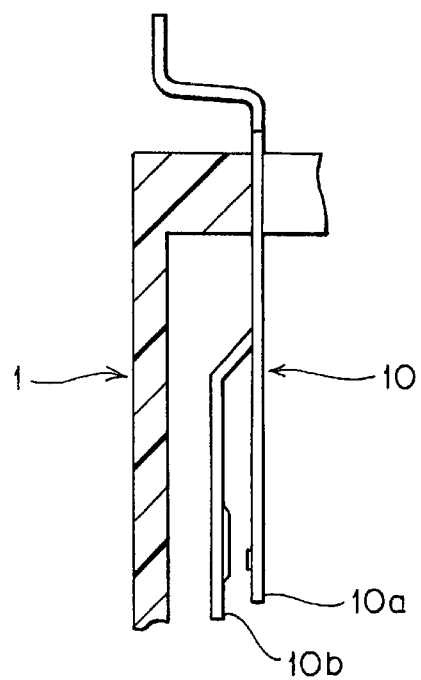
FIG. 8 is a side view showing the switch according to an embodiment of the present invention.
Figure 9:
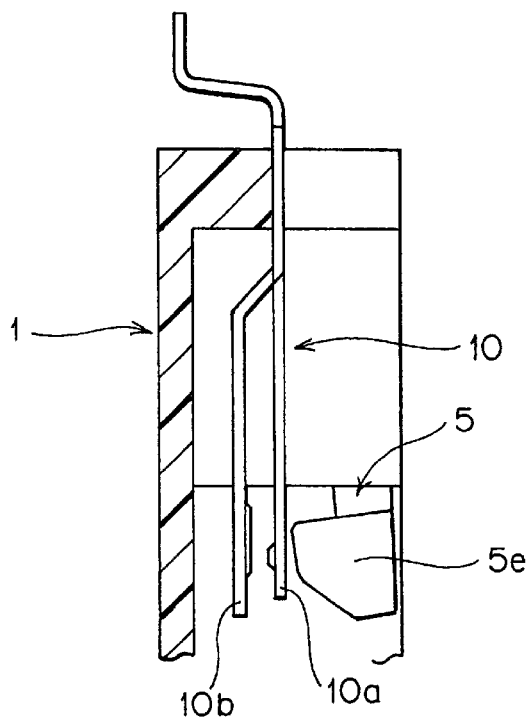
FIG. 9 is an explanatory view showing a state that the switch is OFF according to the present invention.
Figure 10:
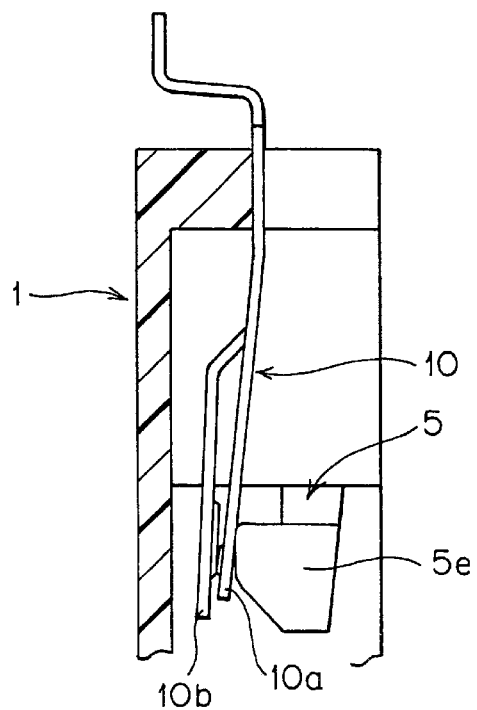
FIG. 10 is an explanatory view showing a state that the switch is ON according to the present invention.
Figure 11:
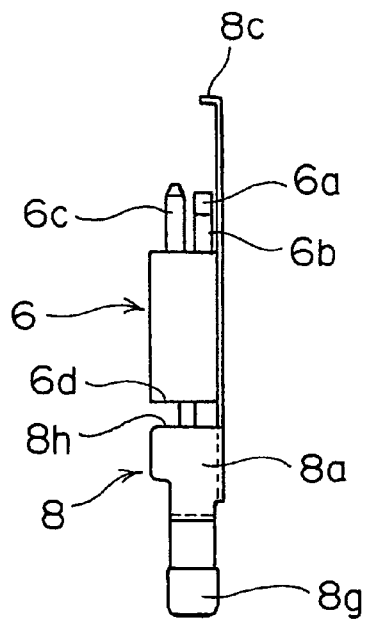
FIG. 11 is a relation view showing an initial state of the push rod and the slide member according to the present invention.
Figure 12:
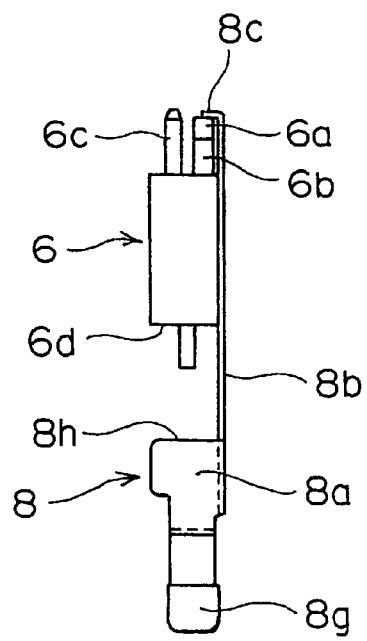
FIG. 12 is a relation view showing a state that the push rod and the slide member engage with each other according to the present invention.

Now, an embodiment of the present invention will be explained based on examples with reference to FIGS. 1 to 20. FIG. 1 is a plan view showing a card connector device, FIG. 2 is a plan view of the card connector device in a state that a cover is removed, FIG. 3 is a plan view of a lock, FIG. 4 is a side view of the lock, FIG. 5 is a plan view of a push rod, FIG. 6 is a side view of the push rod, FIG. 7 is a plan view of a switch, FIG. 8 is a side view of the switch, FIG. 9 is an explanatory view of a state that the switch is OFF, FIG. 10 is an explanatory view of a state that the switch is ON, FIG. 11 is a relation view of an initial state of the push rod and the slide member, and FIG. 12 is a relation view of a state that the push rod and the slide member engage with each other.

In the drawings, a housing 1 is formed in an approximately square shape made of electrically insulating material such as synthetic resins and the like and is provided with a receiving portion 1a in which a card 4, to be described later, is inserted and received therein. A plurality of contact terminals 2a made of conductive metal are arranged on the inner back portion of the receiving portion 1a and one end of the contact terminals 2a project toward the outside of the housing 1 and are formed with connection terminals 2b to be connected to circuit patterns of an external circuit board and the like (Not Shown).

Also, on the surrounding surface portion of the housing 1, a plurality of engagement claws 1b for engaging with a cover 9, to be described later, are provided.

On one side edge of the housing 1, an ejector mechanism provided next to the receiving portion 1a. A slide member 6, to be described later, is slidably arranged in the ejector mechanism biased by a return spring 3. Also, on the upper end of the ejector mechanism, a lock 5, to be described later, is rotatably fixed. On the right side, as shown in the Figures, a slidable push rod 8, to be described later, is guided.

Also, a switch 10, to be described later, is attached to the ejector mechanism.

The card 4 in which an integrated circuit (IC) is received is widely used as a recording medium. On the bottom surface side of the card 4, a plurality of contacts (Not Shown) are formed at one end thereof, and by electrically contacting corresponding members of a plurality of contact terminals 2a provided in the receiving portion 1a of the housing 1, various information processing can be carried out with outside electronic equipment connected to contact terminals 2a.

Also, one side of the card 4 is provided with a concave portion 4a for engaging with a second arm portion 7b of an eject arm 7, to be described later.

The lock 5 is formed in an approximately U-shape and made of insulating material such as synthetic resins and the like In the base portion of the lock 5, a pair of fixing axes 5a for rotatably fixing lock 5 to the housing 1 are provided. Also, a lock piece 5b and a switch manipulating piece 5c extending from the base portion of lock 5 and facing parallel to each other are formed. At the front end of the lock piece 5b, a fixing portion 5d having a hook shape capable of engaging with and disengaging from the slide member 6, to be described later, is formed. The push rod 8, to be described later, abuts against the fixing portion 5d so that the lock piece 5b turns about the fixing axes 5a as a supporting point.

Also, at the front end of the switch manipulating piece 5c, a driving portion 5e for opening and closing the switch 10 by pressing a movable contact 10a of switch 10, to be described later, is formed. The lock piece 5b and the switch manipulating piece 5c turn integrally about the fixing axes 5a that provide supporting points for the lock 5.

In this case, the turning direction of the lock 5 is arranged to be able to turn in a direction perpendicular (up and down direction in the Figures) to the flat surface of the card 4.

Because the lock piece 5b for engaging with and disengaging from the slide member 6, to be described later, the switch manipulating piece 5c for operating the switch 10, to be described later, and the lock piece 5b are formed in the lock 5 as one body, it is possible to form the locking mechanism of the slide member 6 and the driving mechanism of the switch 10 with one part, thereby accomplishing a reduction of parts and improvement of assembly.

The slide member 6 is made of insulating materials such as synthetic resins and the like. On one end of the slide member 6, an engagement arm 6b having an engagement projection 6a for engaging with the fixing portion 5d of the lock 5 is provided. Also, a spring fixing portion 6c, which restrains one end of the return spring 3 (the other end of return spring 3 being fixed to the housing 1) is formed side by side with the engagement arm 6b. On the other end opposite to the spring fixing portion 6c, a stopper surface 6d consisting of a wide plane abutting against a stopper portion 8h of the push rod 8, to be described later, is formed.

Also, an opening is formed approximately at the center of the slide member 6. At the center of the opening, the eject arm 7, to be described later, is attached to be able to turn.

The slide member 6 is arranged in the housing 1 to be biased by the return spring 3 and is attached to be able to shifted in the up and down direction in the housing 1, that is, in the inserting and discharging direction of the card 4.

The eject arm 7 is formed in an approximately U-shape and is made of insulating materials such as synthetic resins and the like. In the eject arm 7, a first and a second arm portions 7a, 7b extending to the outside from the base portion are formed. The first arm portion 7a is provided to engage with the front end of the card 4 upon insertion into the receiving portion 1a of the housing 1. Also, the second arm portion 7b, the front end of which is approximately arc-shaped, is formed and engage with and disengage from the concave portion 4a at one side of card 4 while turning within the concave portion 4a.

The push rod 8 is formed by bending metal sheet plate stock and consists of a base plate 8a having a square shape and a side plate 8b having a sheet shape bent at a right-angle and extended elongately from one end of the base plate 8a.

At the extended front end of the side plate 8b, an engagement piece 8c is formed to abut against the front end of the engagement arm 6b of the slide member 6 in accordance with the shift of the slide member 6. Also, a holding projection 8d having a convex shape for holding the lock piece 5b of the lock 5 at a position where the lock piece 5b disengages from the engagement projection 6a of the slide member 6 while the slide member 6 is shifted to the fit position of the card, is formed. A recess 8e extending from the holding projection 8d and having a concave shape for shifting the lock piece 5b to a position where the lock piece 5b engages with the engagement projection 6a when the slide member 6 is shifted to the fit position of the card, is formed. Also provided is a release manipulating portion 8f formed of sloped surface and extending from the recess 8e. By abutting the release operating portion 8f against the fixing portion 5d of the lock piece 5b, the lock piece 5b turns about the fixing axes 5a as supporting points.

Because the holding projection 8d and the recess 8e which regulate turning of the lock piece 5b by engaging with or disengaging from the lock piece 5b of the lock 5 corresponding to the fit position of the card are formed in the push rod 8, it is not necessary to separately provide a holding mechanism for the lock piece of the lock 5 and simplification of the construction can be obtained and it is possible that miniaturization and reduced cost of the connector device can be accomplished.

Also, a push button 8g manipulated by pressing with a human finger is attached to the base plate 8a. On the side opposite to the push button 8g, a stopper portion 8h made of a wide plane is provided. By abutting the stopper surface 6d of the slide member 6 against the stopper portion 8h, the shift of the slide member 6 is regulated. Also, the push rod 8 is assembled into the housing 1 together with the slide member 6 and the side plate 8b is guided by the housing 1, so that the push rod 8 is slidable within the housing 1.

The cover 9 is formed of metal plate material and includes a top plate 9a having a flat plate shape and a horizontal plate bended at right-angle from the top plate 9a and having a plurality of fixing windows (Not Shown) for engaging the engagement claws 1b of the housing 1. The cover 9 is attached to the top surface side of the housing 1 to cover the opening of the housing 1.

Also, a plate shaped biasing member 9b formed by cutting is provided in the top plate 9a of the cover 9. The biasing member 9b abuts against the lock piece 5b of the lock 5 to act as a spring piece to bias the fixing portion 5d toward the engagement projection 6a of the slide member 6.

The switch 10 includes a movable contact 10a and a stationary contact 10b made of a pair of conductive metal plates arranged to face each other. One end of both the movable contact 10a and the fixed contact 10b is secured to the housing 1, while the other end of these contacts is free and is arranged initially with a predetermined gap therebetween. In this case, switch 10 is normally open (OFF) and contacts 10a and 10b are not electrically connected. However, in other embodiments of the present invention, the contacts may initially be in a normally closed state (ON).

In the switch 10, if the lock 5 turns in response to a shift of the slide member 6, the switch manipulating piece 5c provided in the lock 5 turns and the driving portion 5e presses the movable contact 10a to electrically connect with the fixed contact 10b, placing switch 10 in the ON state.

Next, the operation of the card connector device described above will be explained with reference to FIG. 13 to FIG. 20.

Figure 13:
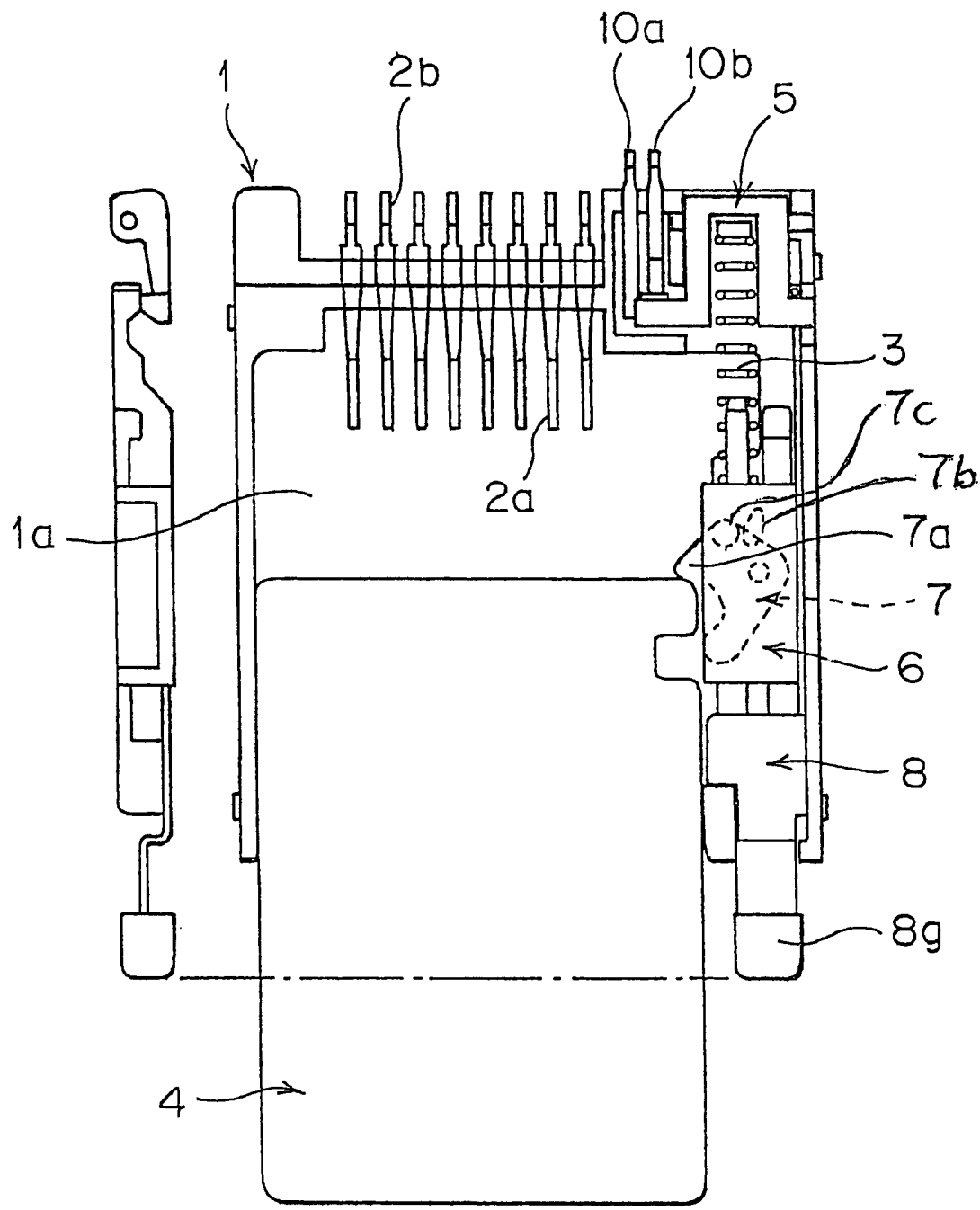
FIG. 13 is an explanatory view showing an initial state that a card is inserted into a housing according to the present invention.
Figure 14:
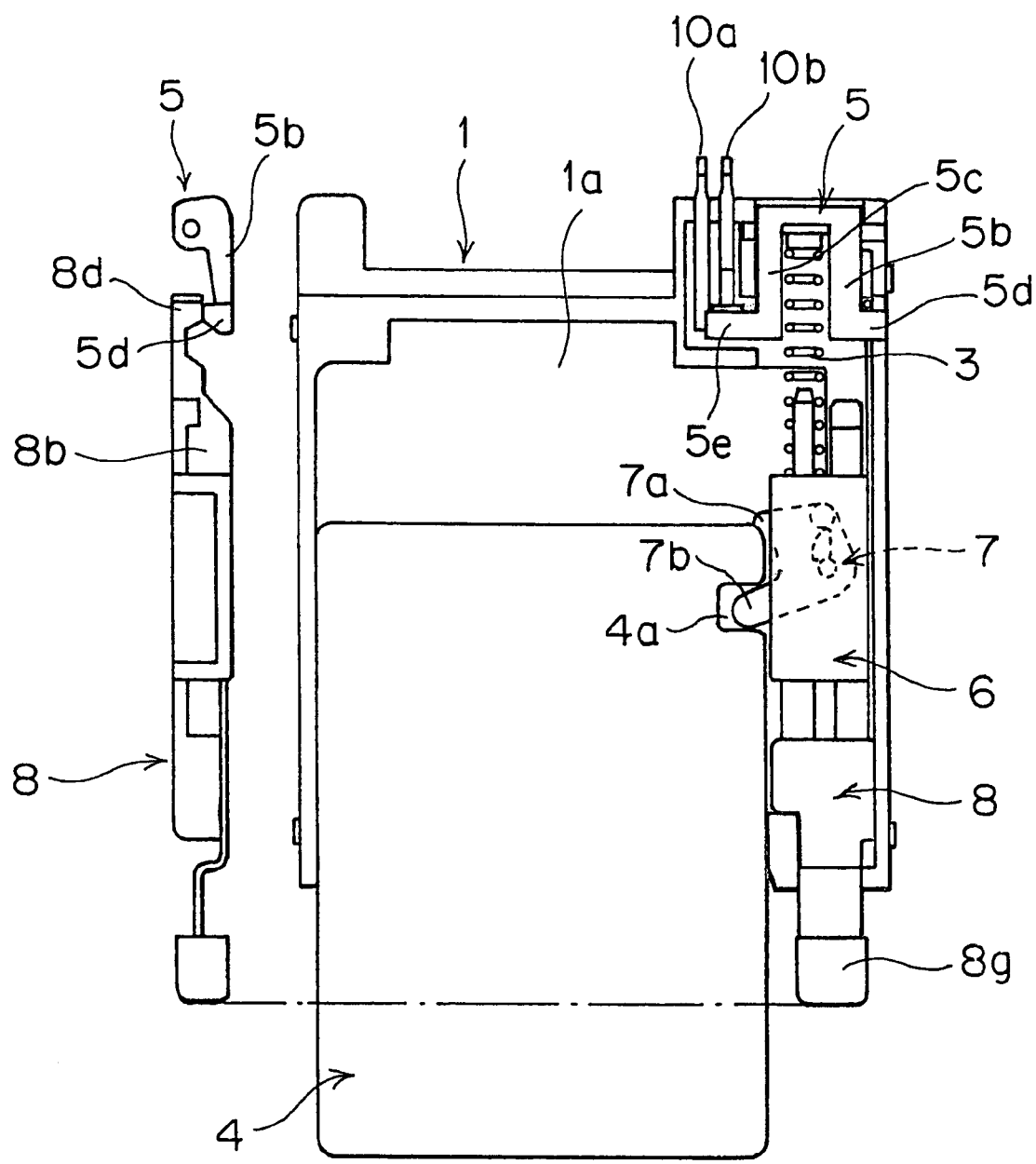
FIG. 14 is an explanatory view showing a state in the case of inserting the card according to the present invention.
Figure 15:
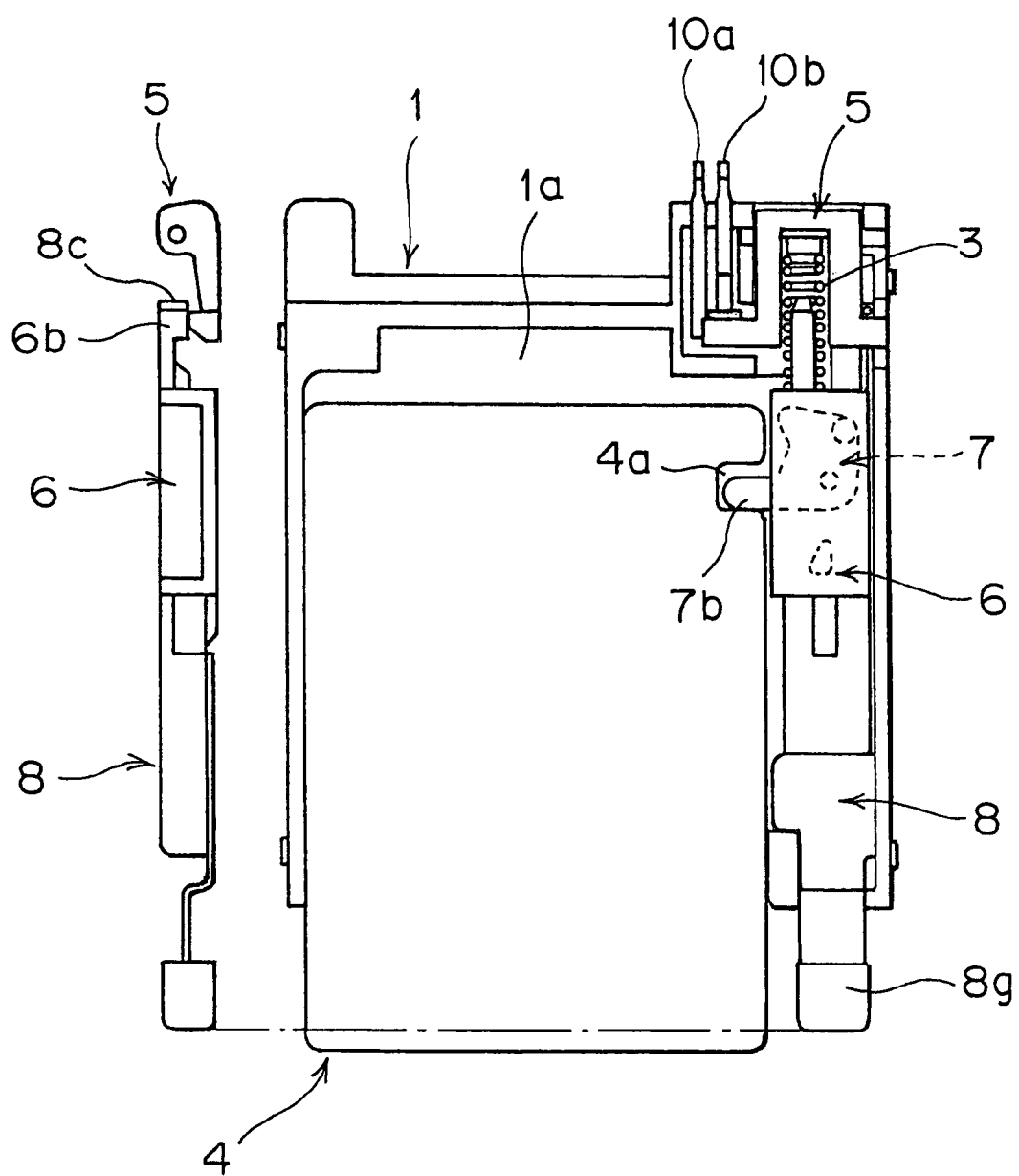
FIG. 15 is an explanatory view showing a state that the push rod and the slide member engage with each other during inserting the card according to the present invention.
Figure 16:
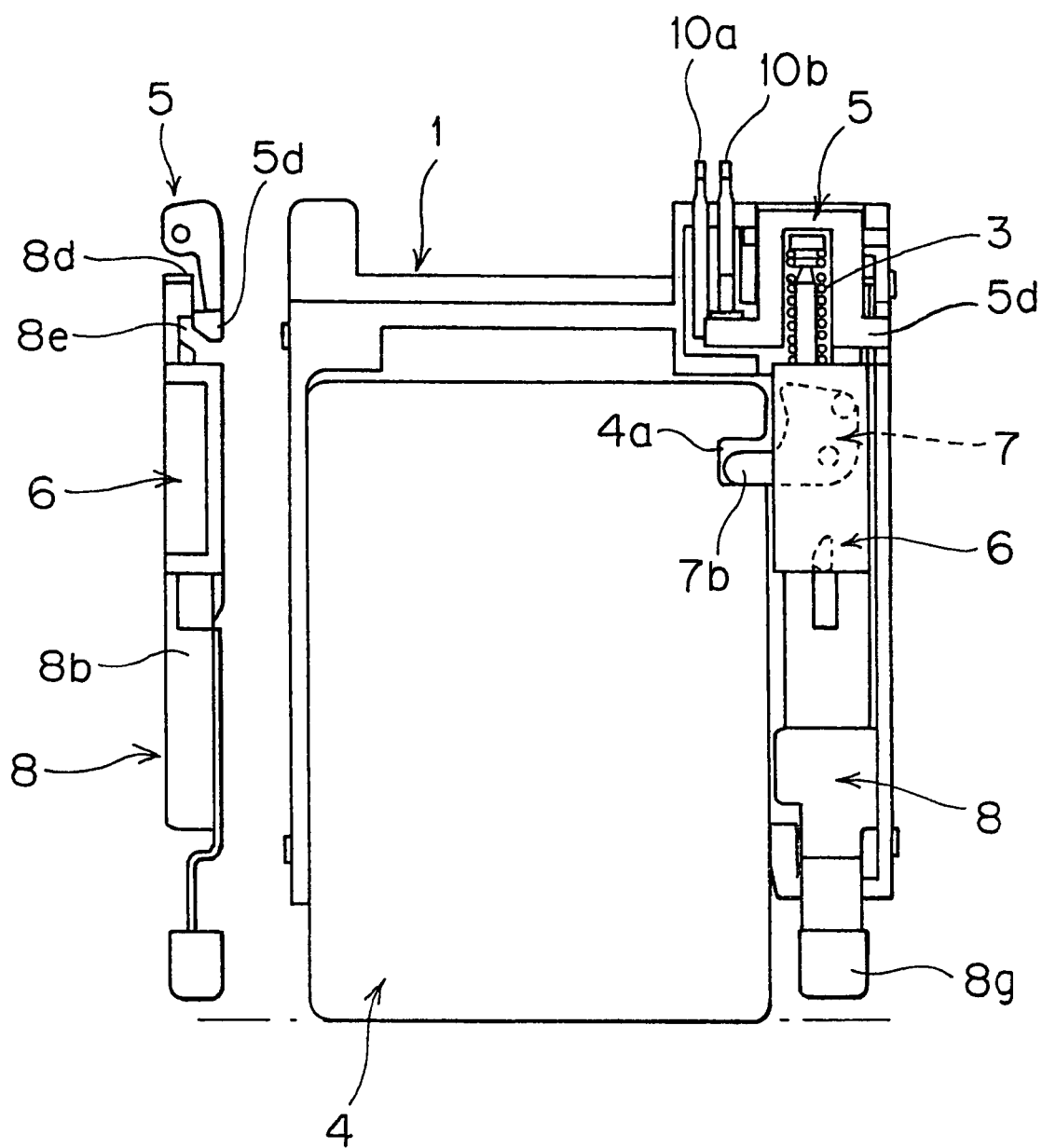
FIG. 16 is an explanatory view showing a state right before the push rod and the lock disengage from each other by shifting the push rod according to the present invention.
Figure 17:
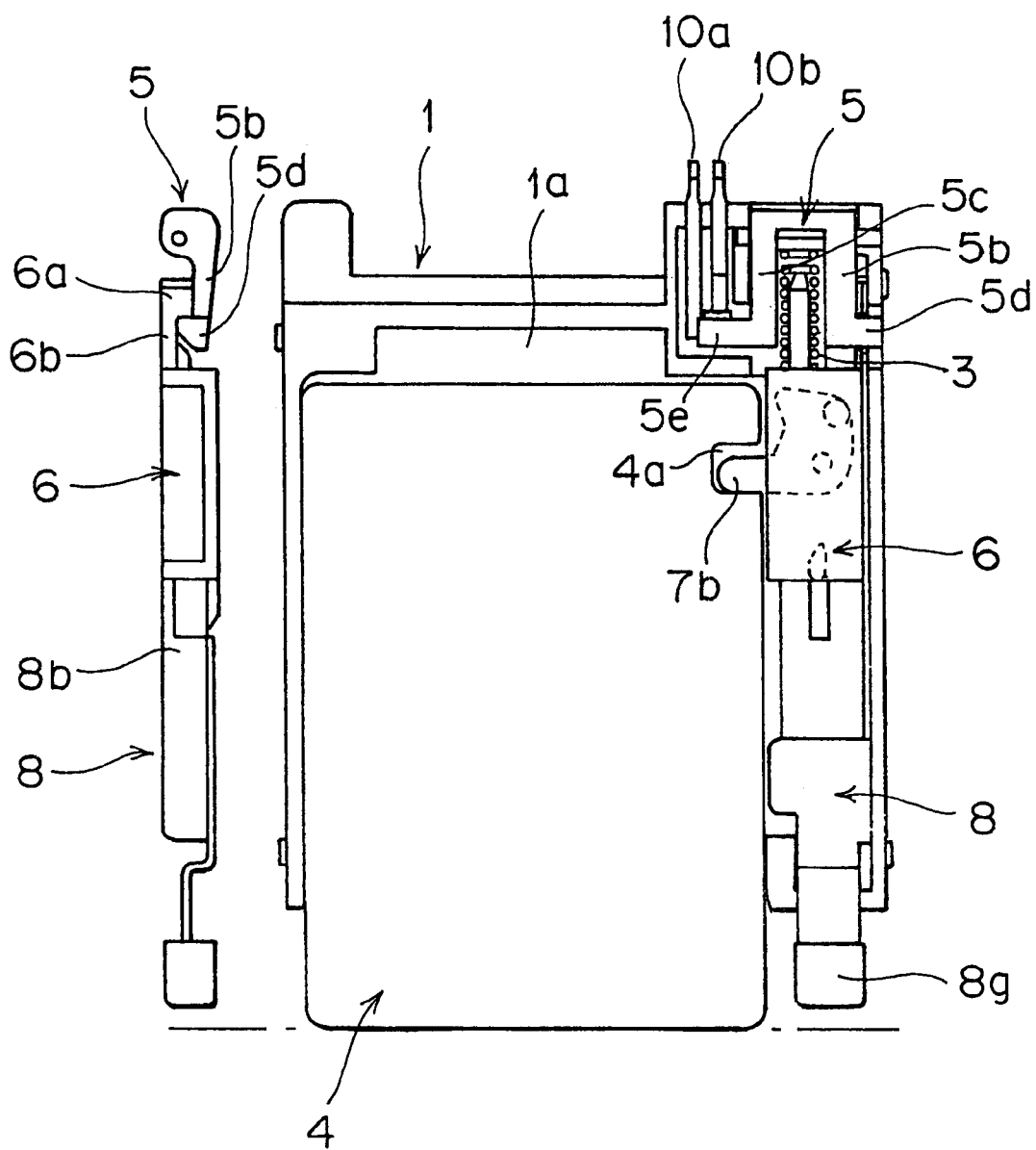
FIG. 17 is an explanatory view showing a state that the slide member and the lock engage with each other to be locked according to the present invention.
Figure 18:
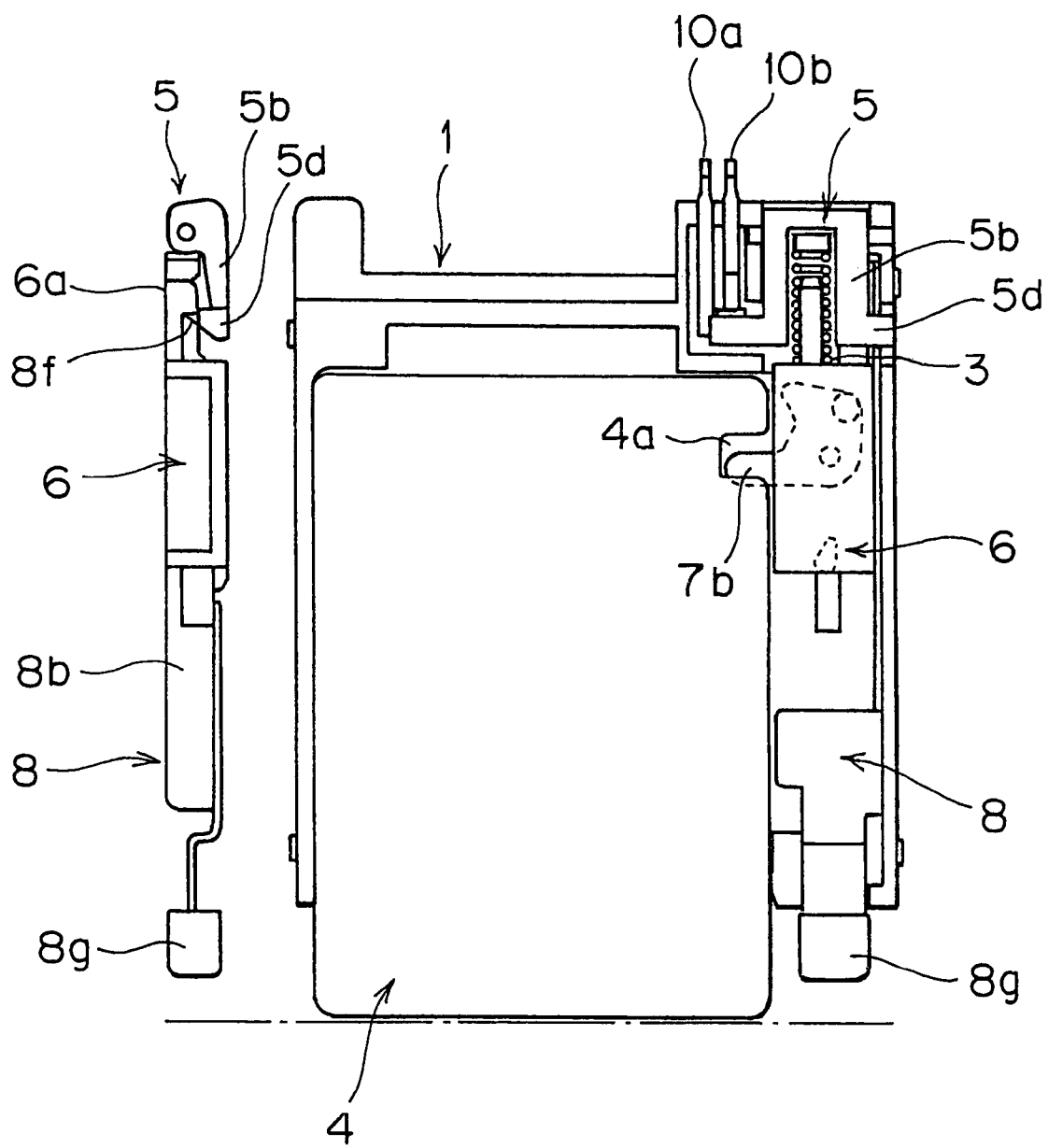
FIG. 18 is an explanatory view showing a state that the push rod is pressed to unlock the lock of slide member according to the present invention.
Figure 19:
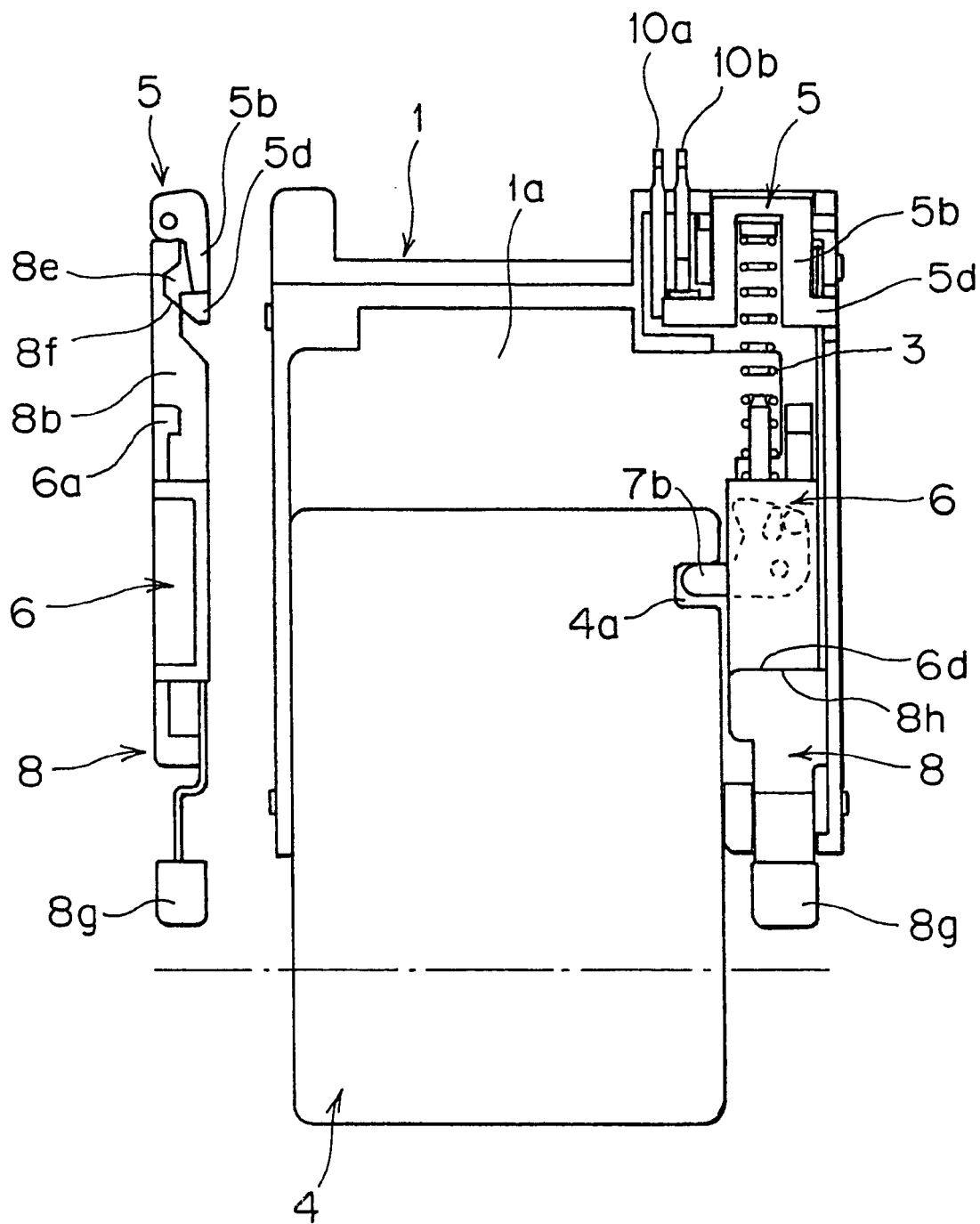
FIG. 19 is an explanatory view showing a state that an unlocked slide member is returned and the card is being discharged.
Figure 20:
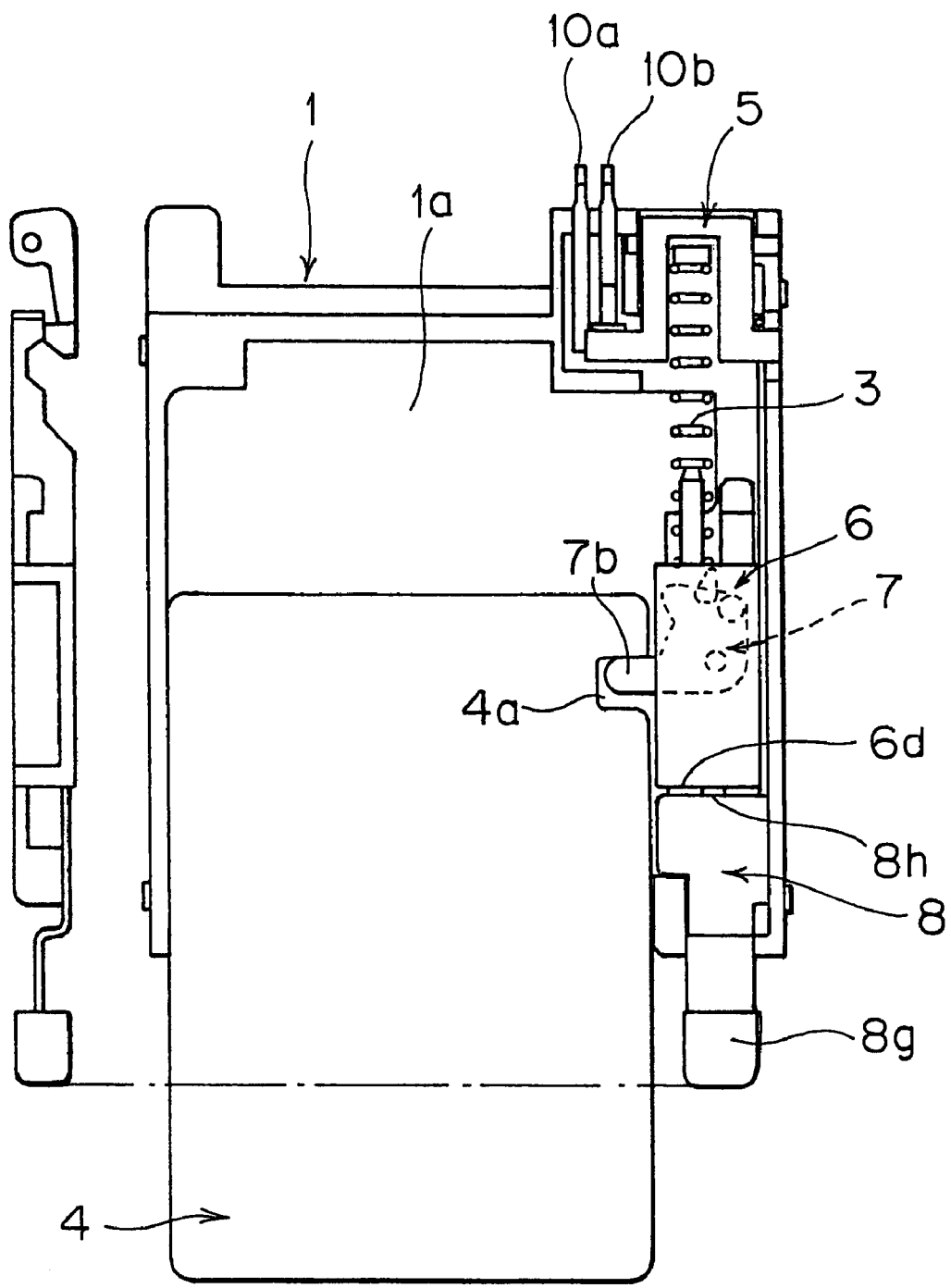
FIG. 20 is an explanatory view showing a state that the push rod is returned to an initial position by return of the slide member during discharge of the card.

FIG. 13 to FIG. 20 are explanatory views showing operation states of the card connector device of the present invention for insertion/discharge. FIG. 13 is an explanatory view showing an initial state that a card is inserted into the housing, FIG. 14 is an explanatory view showing a state in the case of inserting the card, FIG. 15 is an explanatory view showing a state that the push rod and the slide member engage with each other during inserting the card, FIG. 16 is an explanatory view showing a state right before the push rod and the lock disengage from each other, FIG. 17 is an explanatory view showing a state that the slide member and the lock engage with each other to be locked according to the present invention, FIG. 18 is an explanatory view showing a state that the push rod is pressed to unlock the lock of the slide member, FIG. 19 is an explanatory view showing a state that the unlocked slide member is returned and the card is being discharged, and FIG. 20 is an explanatory view showing a state that the push rod is returned to an initial position by the return of the slide member when the card is being discharged.

Moreover, the above drawings show partial side views in order to facilitate understanding of the engaging/disengaging states of the lock and the slide member, and the lock and the push rod.

First, the card 4 is inserted into the receiving portion 1a of the housing 1. At that time, the first arm portion 7a of the eject arm 7 abuts against the front end of the card 4 and the first arm portion 7a is pressed in the direction of insertion of the card (refer to FIG. 13).

Because the shift of the eject arm 7 is regulated by a cam (Not Shown) of the housing 1, upon further insertion of card 4 the first arm portion 7a does not turn in the inserting direction of the card 4 and the slide member 6 is shifted in the inserting direction of the card against the biasing force of the return spring 3. At that time, a cam pin (Not Shown), provided in the eject arm 7, is shifted along the cam wall of the cam provided in the housing 1, so that the eject arm 7 turns a predetermined distance in the inserting direction of the card 4. By means of this turn, the second arm portion 7b engages with the concave portion 4a of the card 4 (refer to FIG. 14).

In this state, the fixing portion 5d of the lock piece 5b of the lock 5 engages with the holding projection 8d at the front end of the side plate 8b of the push rod 8, and accordingly, because the driving portion 5e of the switch manipulating piece 5c of the lock 5 is separated from the movable contact 10a of the switch 10, the switch 10 is in OFF state (refer to FIG. 9).

Next, if the card 4 is pressed further in the inserting direction against the biasing force of the return spring 3, the slide member 6 is shifted in the inserting direction of the card 4 and the contacts (Not Shown) of the card. 4 connect to corresponding contact terminals 2a of the housing 1. At that time, the front end of the engagement arm 6b of the slide member 6 is abutted against the engagement piece 8c at the front end of the push rod 8 (refer to FIG. 15).

Also, if the card 4 is pressed yet further in the inserting direction, the slide member 6 is shifted in the inserting direction of the card and the push rod 8 is shifted in the inserting direction of the card, so that the fixing portion 5d of the lock 5 disengages from the holding projection 8d of the push rod 8 and opposes the recess 8e (refer to FIG. 16).

Because the engagement piece 8c, which in this state abuts against the front end of the engagement arm 6b of the slide member 6, follows the shift of the slide member 6, it is possible to appropriately and accurately regulate the turning of the lock 5 about the pair of fixing axes 5a.

Also, if card 4 is pressed yet further in the inserting direction of the card, the slide member 6 is shifted in the inserting direction and the card 4 will finally abut and stop against the internal edge portion of the receiving portion 1a of the housing 1. In this state, the insertion of the card 4 is complete and the card 4 is fitted into the housing 1. Accordingly, further shifting of the slide member 6 and the eject arm 7 is stopped. In this state, because the lock piece 5b of the lock 5 is biased toward the engagement arm 6b of the slide member 6 by the biasing member 9b provided in the cover 9 and the fixing portion 5d of the lock piece 5b is movable toward the recess 8e when disengaging from the holding projection 8d of the push rod 8, the lock 5 turns clockwise as shown in side view. At that time, the engagement projection 6a engages with the fixing portion 5d of the lock 5, so that the slide member 6 is locked at this position (refer to FIG. 17).

In this state, because the fixing portion 5d of the lock piece 5b of the lock 5 is shifted within the recess 8e of the side plate 8b of the push rod 8, the lock 5 turns clockwise as shown in side view and accordingly the driving portion 5e of the switch manipulating piece 5c of the lock 5 presses the movable contact 10a of the switch 10, so that the movable contact 10a and the fixed contact 10b are connected to each other to set the switch 10 in the ON state (refer to FIG. 10).

According to the above construction, when the slide member 6 is shifted in accordance with the fit position of inserted card 4, the switch manipulating piece 5c, which turns in response to the turning of the lock piece 5b of the lock 5 locking the slide member 6 at the fit position of the card 4 and the switch 10, is operated by the driving portion 5e of the switch manipulating piece 5c. Therefore, because switch 10 can be operated only when the lock piece 5b locks the slide member 6 it is possible to accurately detect whether or not the card 4 is locked at the fit position.

Next, to discharge the card 4 fitted into the housing 1, push button 8g of the push rod 8 is pressed with a finger in the inserting direction of the card 4 to shift the push rod 8, (refer to FIG. 17). The lock piece 5b of the lock 5 turns counterclockwise, as shown in the side views, by pressing the fixing portion 5d of the lock 5 with the release manipulation portion 8f so that the fixing portion 5d of the lock 5 disengages from the engagement projection 6a of the slide member 6 (refer to FIG. 18).

The slide member 6 is shifted in the discharging direction of the card 4 by the biasing force of the return spring 3. At that time, because the release manipulating portion 8f of the push rod 8 is formed in the side plate 8b having a sheet shape extended elongately at one bended end of metal plate, it is possible to arrange these elements so as not to interrupt the shift of the slide member 6 in the discharging direction.

While the slide member 6 is shifted in the discharging direction of the card, the eject arm 7 is shifted in the discharging direction of the card along with the slide member 6, regulating the turning thereof The stopper portion 8h, formed in a wide plane, is provided in the base plate 8a of the push rod 8. In this state, slide member 6, in response to the biasing force of return spring 3, continues to shift in the card discharging direction until the stopper surface 6d provided on one end of the slide member 6 abuts against the stopper portion 8h, surely stopping the shift of slide member 6 and the discharge of card 4 from housing 1. At that time, the contacts (Not Shown) of the card 4 and the corresponding contact terminals 2a of the housing 1 are released from electrical contact, (refer to FIG. 19).

In this case, because the concave portion 4a engages with the second arm portion 7b in the card 4 and turning of the eject arm 7 is regulated, it is possible to prevent the card 4 from jumping out the receiving portion 1a of the housing 1.

Next, by releasing the pressing force on the push rod 8, the push rod 8 is returned to its initial standby position by the biasing force of a coil spring (Not Shown). At that time, the stopper surface 6d of the slide member 6 and the stopper portion 8h of the push rod 8 no longer abut, so that the slide member 6 can be shifted in the discharging direction of the card 4 (refer to FIG. 20).

In this state, if the card 4 is manually extracted, the slide member 6 is shifted forward against the biasing force of the push rod coil spring (Not Shown), so that the eject arm 7 can turn in the discharging direction of the card.

Also, upon turning of the eject arm 7 in the discharging direction of the card, the second arm portion 7b disengages from the concave portion 4a of the card 4, so that the card 4 is discharged from the receiving portion 1a of the housing 1 and the slide member 6 is shifted in the inserting direction of the card by biasing force of the coil spring 3 to be returned to the initial state (refer to FIG. 13).

According to the example of the present invention, because the switch 10 is operated corresponding to the engagement/disengagement of the slide member 6 and the lock 5 and detects that the card 4 is held at the fit position by engaging with the lock 5, the lock 5 is operated only when the lock 5 locks the slide member 6 and thus, it is possible to accurately detect that the card 4 is locked at the fit position.

As described above, the card connector of the present invention comprises a slide member for engaging a card attached to and detached from a housing slidable in the card inserting and discharging direction; a return spring for biasing the slide member in the direction of discharging the card; a lock for holding the slide member against biasing force of the return spring at a position where the card is fitted; and a push rod arranged to be able to shift between a standby position and a pushed position for unlocking the lock by pressing manipulation to shift the slide member to a discharge position of the card, wherein a switch is provided in the housing, the switch operating in accordance with engagement/disengagement of the slide member and the lock and detecting that the card is held at the fit position by engaging with the lock. Therefore, because the switch is operated only when the lock locks the slide member, it is possible to reliably detect whether or not the card is locked at the fit position.

Also, the lock comprises a biasing member supported in the housing capable of biasing the lock to turn in a direction that engages the lock with the slide member, wherein the push rod is provided with a holding projection for holding the lock against the biasing force of the biasing member at a position where the lock disengages from the slide member until the slide member is shifted to the fit position of the card, and a recess for shifting the lock to a position where the lock engages with the slide member when the slide member is shifted to the fit position of the card. Therefore, because actuation of the lock can be regulated corresponding to the fit position of the card, it is not necessary to provide a separate holding mechanism for the lock piece of the lock, so that simplification of construction can be obtained and it is possible that miniaturization and reduced cost of the connector device may be accomplished.

Also, the push rod is provided with an engagement piece abutting against the slide member, so that when the slide member is shifted to the fit position of the card, the holding projection disengages from the lock by pressing the engagement piece. Therefore, it is possible to appropriately and accurately regulate the turning of the lock.

Also, a lock piece for engaging with and disengaging from the slide member by turning and a switch-manipulating piece for operating the switch are integrally formed in the lock. Therefore, it is possible to form the locking mechanism of the slide member and the driving mechanism of the switch with one part, thereby accomplishing a reduction of parts and improvement of assembly.

Also, those who are skilled in the art will appreciate that various modifications, additions, and substitutions are possible without departing from the scope and spirit of the present invention. Therefore, it should be understood that the present invention is limited only to the accompanying claims and the equivalents thereof, and includes the aforementioned modifications, additions, and substitutions.

What is claimed is:

1. A card connector device, comprising:

a housing;

a slide member for engaging a card and supported by said housing, wherein said card may be inserted into said housing along an inserting direction and may be discharged from said housing along a discharging direction and wherein said slide member slides in the inserting direction and discharging direction;

a return spring supported by said housing for biasing said slide member in the direction of discharging said card;

a lock supported by said housing for holding said slide member against the biasing force of said return spring at a position where the card is fitted;

a push rod supported by said housing arranged to be able to shift between a standby position and a pushed position for unlocking said lock by pressing to shift said slide member to a discharge position; and a switch supported by said housing, said switch operating in accordance with engagement and disengagement of said slide member and said lock and detecting that the card is held at the fit position by engaging with said lock, wherein in the card connector device of the present invention, the card is pushed out by the slide member when the lock is unlocked by pressing the push rod, the switch supported by the housing operates in accordance with engagement and disengagement of the slide member and the lock, the lock comprises a biasing member for biasing the lock to be able to turn in a direction that the lock engages with the slide member, the push rod is provided with a holding projection for holding the lock against the biasing force of the biasing member at a position where the lock disengages from the slide member, a recess for shifting the lock to a position where the lock engages with the slide member, and an engagement piece which engages with the slide member and which, when the slide member is shifted to the fit position of the card, changes the state of the push rod from a state in which the holding projection holds the lock at the position where the lock disengages from the slide member to a state in which the recess is able to shift the lock in the direction that the lock engages with the slide member, and when the slide member is shifted along with the card to the fit position of the card, the lock, which is held by the holding projection of the push rod at the position where the lock disengages from the slide member, is shifted to the position where the lock engages with the slide member and locks the slide member, and then the switch is activated and detects that the card is held at the fit position.

2. A card connector device according to claim 1, wherein a lock piece for engaging with and disengaging from said slide member by turning and a switch manipulating piece for operating said switch are integrally formed in said lock.

* * * * *